(12) United States Patent
Guo et al.

(10) Patent No.: US 11,700,540 B2
(45) Date of Patent: Jul. 11, 2023

(54) METHOD AND DEVICE FOR MONITORING NETWORK DATA

(71) Applicant: China Academy of Telecommunications Technology, Beijing (CN)

(72) Inventors: Yali Guo, Beijing (CN); Hucheng Wang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 88 days.

(21) Appl. No.: 17/042,217

(22) PCT Filed: Dec. 6, 2018

(86) PCT No.: PCT/CN2018/119615
§ 371 (c)(1),
(2) Date: Sep. 28, 2020

(87) PCT Pub. No.: WO2019/184433
PCT Pub. Date: Oct. 3, 2019

(65) Prior Publication Data
US 2021/0022022 A1   Jan. 21, 2021

(30) Foreign Application Priority Data

Mar. 27, 2018  (CN) .......................... 201810260542.0

(51) Int. Cl.
*H04W 24/08* (2009.01)
*H04L 41/14* (2022.01)
(Continued)

(52) U.S. Cl.
CPC ............. *H04W 24/08* (2013.01); *H04L 41/14* (2013.01); *H04L 43/062* (2013.01);
(Continued)

(58) Field of Classification Search
CPC ..... H04W 24/08; H04W 24/04; H04W 24/10; H04W 24/02; H04L 41/14; H04L 43/062; H04L 43/0876
See application file for complete search history.

(56) References Cited

U.S. PATENT DOCUMENTS

2018/0077590 A1    3/2018  Sharma et al.
2020/0213876 A1*   7/2020  Sun ..................... H04L 12/1407
(Continued)

FOREIGN PATENT DOCUMENTS

CN    104221411 A    12/2014
CN    105979542 A     9/2016
(Continued)

OTHER PUBLICATIONS

Kddi, "Proposal for removal of editor's note In A.2.2.6 and parameters notified by NWDAF", SA WG2 Meeting #122bis, Aug. 21-25, 2017, Sophia Antipolis, France, total 2 pages, S2-175539.
Huawei et al.,"Use Case: NWDA-assisted detection of situations in E2E QoS Profiles", SA WG2 Meeting #126, Feb. 26, Mar. 2, 2018, Montreal, Canada, total 3 pages, S2-181967.
(Continued)

*Primary Examiner* — Chae S Lee
(74) *Attorney, Agent, or Firm* — Kilpatrick Townsend & Stockton, LLP

(57) ABSTRACT

Provided in the embodiments of the present application are a method and device for monitoring network data. The method comprises: a NWDAF determines a terminal UE to be monitored that requires network data analysis and the type of data analysis for the UE to be monitored; the NWDAF determines a provider network function network element and a monitoring event which correspond to the UE to be monitored according to the type of data analysis for the UE to be monitored, the provider network function network element being used to provide source data for the UE to be monitored which is related to the data analysis type, and the monitoring event being used to indicate to the provider network function network element to monitor the source (Continued)

data; and the NWDAF sends the monitoring event to the provider network function network element.

18 Claims, 5 Drawing Sheets

(51) Int. Cl.
*H04L 43/062* (2022.01)
*H04L 43/0876* (2022.01)
*H04M 15/00* (2006.01)
*H04W 4/16* (2009.01)
*H04W 8/08* (2009.01)

(52) U.S. Cl.
CPC ........ *H04L 43/0876* (2013.01); *H04M 15/66* (2013.01); *H04W 4/16* (2013.01); *H04W 8/08* (2013.01)

(56) References Cited

U.S. PATENT DOCUMENTS

2020/0252813 A1* 8/2020 Li .................... H04W 24/08
2021/0235288 A1* 7/2021 Dao .................. H04W 24/02

FOREIGN PATENT DOCUMENTS

| CN | 106454927 A | 2/2017 |
| CN | 107547218 A | 1/2018 |
| CN | 107548095 A | 1/2018 |

OTHER PUBLICATIONS

Nokia et al., "Corrections on the specification of Network Exposure services", SA WG2 Meeting #126, Feb. 26-Mar. 2, 2018, Montreal, Canada, total 18 pages, S2-183014(revision S2-182993).

Nokia et al., "Corrections on the specification of Network Exposure services", SA WG2 Meeting #126, Feb. 26-Mar 2, 2018, Montreal, Canada, total 19 pages, S2-182993(revision S2-182898).

\* cited by examiner

METHOD AND DEVICE FOR MONITORING NETWORK DATA

This application is a US National Stage of International Application No. PCT/CN2018/119615, filed on Dec. 6, 2018, which claims priority to the Chinese Patent Application No. 201810260542.0, filed to the Patent Office of the People's Republic of China on Mar. 27, 2018 and entitled "Method and Device for Monitoring Network Data", the entire contents of which are incorporated herein by reference.

FIELD

This application relates to the field of communication and in particular to a method and a device for monitoring network data.

BACKGROUND

A network data analytics function (NWDAF) is introduced to the fifth generation mobile network (5G), and by utilizing the function, network data may be analyzed, and then, an analytics result may be provided for a 5G network, so that 5GC may be subjected to network optimization.

At present, the NWDAF may collect load data of network slices according to a static configuration to perform analytics and provide network data analytics results relevant to slice loads for a network function such as a policy control function (PCF), so that the network function such as the PCF may formulate a corresponding network control policy for a terminal to which the slices belong or perform a corresponding network behavior according to the analytics result of the NWDAF. However, the NWDAF may only perform slice-level network data analytics, the load data of the network slices acquired by the NWDAF is also required to be acquired based on a network management system, for example, the NWDAF acquires information such as a function level load condition of a certain function in a certain slice or load conditions of functions in the slice by the network management system, and therefore, the NWDAF is to support the monitoring and analytics of data except for loads of the network slices and is to collect and counting network relevant data of specific UE.

Based on the above, it may be known that certain limitations exist in a mobile communication network systems during network data analytics.

SUMMARY

Embodiments of this application provide a method and device for monitoring network data to solve the problem of limitations existing in a mobile communication network systems during network data analytics.

On the first aspect, an embodiment of this application provides a method for monitoring network data, including:

determining, by a NWDAF, a UE to be monitored for which network data analytics is required, and a type of data analytics for the UE to be monitored;

determining, by the NWDAF, a provider network function and a monitoring event for the UE according to the type of data analytics, wherein the provider network function provides source data, corresponding to the type of data analytics, of the UE to be monitored, and the monitoring event indicates the provider network function to monitor the source data; and transmitting, by the NWDAF, the monitoring event to the provider network function.

In one embodiment, after transmitting, by the NWDAF, the monitoring event to the provider network function, the method further includes:

receiving, by the NWDAF, the source data, reported by the provider network function according to the monitoring event and corresponding to the type of data analytics, of the UE to be monitored; and analyzing, by the NWDAF, the received source data to generate a result of data analytics, conforming to the type of data analytics, for the UE to be monitored.

In one embodiment, said determining, by the NWDAF, UE to be monitored for which the network data analytics is required, and the type of data analytics for the UE to be monitored includes:

determining, by the NWDAF, the UE to be monitored for which the network data analytics is required and the type of data analytics corresponding to a requirement of data analytics according to a UE identity and the requirement of data analytics indicated in a request of data analytics received from a network function, or a static configuration.

In one embodiment, said transmitting, by the NWDAF, the monitoring event to the provider network function includes:

transmitting, by the NWDAF, the monitoring event to an unified data management (UDM) or a policy control function (PCF), to transmit the monitoring event to the provider network function by the UDM or the PCF.

In one embodiment, said transmitting, by the NWDAF, the monitoring event to the UDM or the PCF includes:

transmitting, by the NWDAF, the monitoring event to a NEF, to transmit the monitoring event to the UDM or the PCF by the NEF.

In one embodiment, while transmitting, by the NWDAF, the monitoring event to the provider network function, the method further includes:

transmitting, by the NWDAF, a NWDAF address and/or an equipment identity of the NWDAF to the provider network function; and said receiving, by the NWDAF, the source data, reported by the provider network function according to the monitoring event and corresponding to the type of data analytics, of the UE to be monitored includes:

receiving, by the NWDAF, the source data, directly transmitted to the NWDAF by the provider network function according to the NWDAF address and/or the equipment identity and corresponding to the type of data analytics, of the UE to be monitored.

In one embodiment, said receiving, by the NWDAF, the source data, reported by the provider network function according to the monitoring event and corresponding to the type of data analytics, of the UE to be monitored includes:

receiving, by the NWDAF, the source data, reported by the provider network function through the UDM or the PCF and corresponding to the type of data analytics, of the UE to be monitored.

In one embodiment, said receiving, by the NWDAF, the source data, reported by the provider network function according to the monitoring event and corresponding to the type of data analytics, of the UE to be monitored includes:

receiving, by the NWDAF, the source data, reported by the NEF and corresponding to the type of data analytics, of the UE to be monitored, after the source data of the UE to be monitored is reported to the NEF by the provider network function through the UDM or the PCF.

In one embodiment, the provider network function includes any one or more of an access and mobility management function (AMF), a session management function (SMF), a next generation-radio access network function (NG-RAN) and a user plane function (UPF).

In one embodiment, the type of data analytics includes moving trajectory analytics and/or service traffic analytics.

In one embodiment, if the type of data analytics is the moving trajectory analytics, the monitoring event is to monitor location information of the UE to be monitored, and said transmitting, by the NWDAF, the monitoring event to the provider network function includes:

transmitting, by the NWDAF, the monitoring event to the AMF for monitoring and/or reporting the location information of the UE to be monitored.

In one embodiment, said analyzing, by the NWDAF, the received source data to generate the result of data analytics, conforming to the type of data analytics, for the UE to be monitored includes:

analyzing, by the NWDAF, a received location information of the UE to be monitored to generate the result of data analytics of a mobility pattern corresponding to the UE to be monitored.

In one embodiment, if the type of data analytics is the service traffic analytics, the monitoring event is to monitor traffic information of the UE to be monitored, and said transmitting, by the NWDAF, the monitoring event to the provider network function includes:

transmitting, by the NWDAF, the monitoring event to the SMF or the UPF for monitoring and/or reporting the traffic information of the UE to be monitored.

In one embodiment, said analyzing, by the NWDAF, the received source data to generate the result of data analytics, conforming to the type of data analytics, for the UE to be monitored includes:

analyzing, by the NWDAF, a received traffic information of the UE to be monitored to generate the result of data analytics of a service traffic model corresponding to the UE to be monitored.

One the second aspect, an embodiment of this application provides a method for monitoring network data, including:

receiving, by a provider network function, a monitoring event from a NWDAF, wherein the monitoring event indicates the provider network function to monitor source data, corresponding to a type of data analytics, of the UE to be monitored, and the provider network function provides the source data, corresponding to the type of data analytics, of the UE to be monitored; and monitoring, by the provider network function, the source data, corresponding to the type of data analytics, of the UE to be monitored according to the monitoring event.

In one embodiment, after monitoring, by the provider network function, the source data, corresponding to the type of data analytics, of the UE to be monitored according to the monitoring event, the method further includes:

reporting, by the provider network function, the source data, corresponding to the type of data analytics, of the UE to be monitored to the NWDAF.

In one embodiment, while receiving, by the provider network function, the monitoring event from the NWDAF, the method further includes:

receiving, by the provider network function, a NWDAF address and/or an equipment identity of the NWDAF, and said reporting, by the provider network function, the source data, corresponding to the type of data analytics, of the UE to be monitored to the NWDAF includes:

directly transmitting, by the provider network function, the source data to the NWDAF according to the NWDAF address and/or the equipment identity.

In one embodiment, said reporting, by the provider network function, the source data, corresponding to the type of data analytics, of the UE to be monitored to the NWDAF includes:

reporting, by the provider network function, the source data, corresponding to the type of data analytics, of the UE to be monitored to the NWDAF through an UDM or a PCF; or reporting, by the provider network function, the source data to a NEF through the UDM or the PCF, to transmit the source data to the NWDAF by the NEF.

In one embodiment, the provider network function includes any one or more of an AMF, a SMF, a NG-RAN and a UPF.

In one embodiment, the type of data analytics includes moving trajectory analytics and/or service traffic analytics.

In one embodiment, if the type of data analytics is the moving trajectory analytics, the monitoring event is to monitor location information of the UE to be monitored, and said monitoring, by the provider network function, the source data, corresponding to the type of data analytics, of the UE to be monitored according to the monitoring event includes:

monitoring, by the AMF, the location information of the UE to be monitored according to the monitoring event.

In one embodiment, if the type of data analytics is the service traffic analytics, the monitoring event is to monitor traffic information of the UE to be monitored, and said monitoring, by the provider network function, the source data, corresponding to the type of data analytics, of the UE to be monitored according to the monitoring event includes:

monitoring, by the SMF or the UPF, the traffic information of the UE to be monitored according to the monitoring event.

On the third aspect, an embodiment of this application provides a monitoring device, including:

a processor, configured to determine a UE to be monitored for which network data analytics is required, and a type of data analytics for the UE to be monitored; and determine a provider network function and a monitoring event for the UE according to the type of data analytics; wherein the provider network function provides source data, corresponding to the type of data analytics, of the UE to be monitored, and the monitoring event indicates the provider network function to monitor the source data; and a transmitter, configured to transmit the monitoring event to the provider network function.

In one embodiment, the monitoring device further includes:

a receiver, configured to receive the source data, reported by the provider network function according to the monitoring event and corresponding to the type of data analytics, of the UE to be monitored, after the monitoring event is transmitted to the provider network function; and the processor, configured to analyze the received source data to generate a result of data analytics, conforming to the type of data analytics, for the UE to be monitored.

In one embodiment, the processor is configured to:

determine the UE to be monitored for which the network data analytics is required and the type of data analytics corresponding to a requirement of data analytics according to a UE identity and the requirement of data analytics indicated in a request of data analytics received from a network function, or a static configuration.

In one embodiment, the transmitter is configured to:
transmit the monitoring event to an UDM or a policy control function (PCF), or transmit the monitoring event to a NEF to transmit the monitoring event to the UDM or the PCF by the NEF, so that the UDM or the PCF transmits the monitoring event to the provider network function.

In one embodiment, the transmitter is further configured to: transmit a NWDAF address and/or an equipment identity of the NWDAF to the provider network function while transmitting the monitoring event to the provider network function; and
the receiver is configured to: receive the source data, directly transmitted to the NWDAF by the provider network function and corresponding to the type of data analytics, of the UE to be monitored according to the NWDAF address and/or the equipment identity.

In one embodiment, the receiver is configured to:
receive the source data, reported by the provider network function through the UDM or the PCF and corresponding to the type of data analytics, of the UE to be monitored, or
receive the source data, reported by the NEF and corresponding to the type of data analytics, of the UE to be monitored, after the source data is reported to the NEF by the provider network function through the UDM or the PCF.

In one embodiment, the provider network function includes any one or more of an AMF, a SMF, a NG-RAN and a UPF.

In one embodiment, the type of data analytics includes moving trajectory analytics and/or service traffic analytics.

In one embodiment, if the type of data analytics is the moving trajectory analytics, the monitoring event is to monitor location information of the UE to be monitored,
the transmitter is configured to: transmit the monitoring event to the AMF for monitoring and/or reporting the location information of the UE to be monitored; and
the processor is configured to: analyze a received location information of the UE to be monitored to generate the result of data analytics of a mobility pattern corresponding to the UE to be monitored.

In one embodiment, if the type of data analytics is the service traffic analytics, the monitoring event is to monitor traffic information of the UE to be monitored,
the transmitter is configured to: transmit the monitoring event to the SMF or the UPF for monitoring and/or reporting the traffic information of the UE to be monitored; and
the processor is configured to: analyze a received traffic information of the UE to be monitored to generate the result of data analytics of a service traffic model corresponding to the UE to be monitored.

On the fourth aspect, an embodiment of this application provides a monitoring device, including:
a receiver, configured to receive a monitoring event from a NWDAF, wherein the monitoring event indicates a provider network function to monitor source data of UE to be monitored, and the provider network function provides the source data, corresponding to the monitoring event and corresponding to the type of data analytics, of the UE to be monitored; and
a processor, configured to monitor the source data, corresponding to the type of data analytics, of the UE to be monitored according to the monitoring event.

In one embodiment, the monitoring device further includes:
a transmitter, configured to report the source data, corresponding to the type of data analytics, of the UE to be monitored to the NWDAF after the processor monitors the source data, corresponding to the type of data analytics, of the UE to be monitored according to the monitoring event.

In one embodiment, the receiver is further configured to: receive a NWDAF address and/or an equipment identity of the NWDAF while receiving the monitoring event from the NWDAF; and
the transmitter is configured to: directly transmit the source data to the NWDAF according to the NWDAF address and/or the equipment identity.

In one embodiment, the transmitter is configured to:
report the source data, corresponding to the type of data analytics, of the UE to be monitored to the NWDAF through an UDM or a PCF; or
report the source data to a NEF through the UDM or the PCF, to transmit the source data to the NWDAF by the NEF.

In one embodiment, the provider network function includes any one or more of an AMF, a SMF, a NG-RAN and a UPF.

In one embodiment, the type of data analytics includes moving trajectory analytics and/or service traffic analytics.

In one embodiment, if the type of data analytics is the moving trajectory analytics, the monitoring event is to monitor location information of the UE to be monitored, and
the processor is configured to monitor the location information of the UE to be monitored according to the monitoring event.

In one embodiment, if the type of data analytics is the service traffic analytics, the monitoring event is to monitor traffic information of the UE to be monitored, and
the processor is configured to monitor the traffic information of the UE to be monitored according to the monitoring event.

On the fifth aspect, an embodiment of this application provides a monitoring device, including:
a first determining device, configured to determine a UE to be monitored for which network data analytics is required, and a type of data analytics for the UE to be monitored;
a second determining device, configured to determine a provider network function and a monitoring event for the UE according to the type of data analytics, wherein the provider network function provides source data, corresponding to the type of data analytics, of the UE to be monitored, and the monitoring event indicates the provider network function to monitor the source data; and
a transmitting device, configured to transmit the monitoring event to the provider network function.

In one embodiment, the monitoring device further includes:
a receiving device, configured to receive the source data, reported by the provider network function according to the monitoring event and corresponding to the type of data analytics, of the UE to be monitored; and
a processing device, configured to analyze the received source data to generate a result of data analytics, conforming to the type of data analytics, for the UE to be monitored.

In one embodiment, the first determining device is configured to: determine the UE to be monitored for which the network data analytics is required and the type of data analytics corresponding to a requirement of data analytics according to a UE identity and the requirement of data analytics indicated in a request of data analytics received from a network function, or a static configuration.

In one embodiment, the transmitting device is configured to:
transmit the monitoring event to an UDM or a PCF; or
transmit the monitoring event to a NEF to transmit the monitoring event to the UDM or the PCF by the NEF, so that the UDM or the PCF transmits the monitoring event to the provider network function.

In one embodiment, the transmitting device is further configured to: transmit a NWDAF address and/or an equipment identity to the provider network function while transmitting the monitoring event to the provider network function; and the receiving device is configured to: receive the source data, directly transmitted to the NWDAF by the provider network function and corresponding to the type of data analytics, of the UE to be monitored according to the NWDAF address and/or the equipment identity.

In one embodiment, the receiving device is further configured to: receive the source data, reported by the provider network function through the UDM or the PCF and corresponding to the type of data analytics, of the UE to be monitored.

In one embodiment, the receiving device is further configured to: receive the source data, reported by the NEF and corresponding to the type of data analytics, of the UE to be monitored, after the source data is reported to the NEF by the provider network function through the UDM or the PCF.

In one embodiment, the provider network function includes any one or more of an AMF, a SMF, a NG-RAN and a UPF.

In one embodiment, the type of data analytics includes moving trajectory analytics and/or service traffic analytics.

In one embodiment, if the type of data analytics is the moving trajectory analytics, the monitoring event is to monitor location information of the UE to be monitored, the transmitting device is configured to: transmit the monitoring event to the AMF for monitoring and/or reporting the location information of the UE to be monitored; and at the moment, the processing device is configured to: analyze the received location information of the UE to be monitored to generate the result of data analytics of a mobility pattern corresponding to the UE to be monitored.

In one embodiment, if the type of data analytics is the service traffic analytics, the monitoring event is to monitor traffic information of the UE to be monitored, the transmitting device is configured to: transmit the monitoring event to the SMF or the UPF for monitoring and/or reporting the traffic information of the UE to be monitored; and at the moment, the processor is configured to: analyze the received traffic information of the UE to be monitored to generate the result of data analytics of a service traffic model corresponding to the UE to be monitored.

On the sixth aspect, an embodiment of this application provides a monitoring device, including:

a receiving device, configured to receive a monitoring event from a NWDAF, wherein the monitoring event indicates a provider network function to monitor source data of UE to be monitored, and the provider network function provides the source data, corresponding to the monitoring event and corresponding to the type of data analytics, of the UE to be monitored; and a monitoring device, configured to monitor the source data, corresponding to the type of data analytics, of the UE to be monitored according to the monitoring event.

In one embodiment, the monitoring device further includes:

a transmitting device, configured to report the source data, corresponding to the type of data analytics, of the UE to be monitored to the NWDAF after the provider network function monitors the source data, corresponding to the type of data analytics, of the UE to be monitored according to the monitoring event.

In one embodiment, the receiving device is further configured to: receive a NWDAF address and/or an equipment identity of the NWDAF while receiving the monitoring event from the NWDAF; and the transmitting device is configured to: directly transmit the source data to the NWDAF according to the NWDAF address and/or the equipment identity.

In one embodiment, the transmitting device is configured to: report the source data, corresponding to the type of data analytics, of the UE to be monitored to the NWDAF through an UDM or a PCF; or report the source data to a NEF through the UDM or the PCF, to transmit the source data to the NWDAF by the NEF.

In one embodiment, the provider network function includes any one or more of an AMF, a SMF, a NG-RAN and a UPF.

In one embodiment, the type of data analytics includes moving trajectory analytics and/or service traffic analytics.

In one embodiment, if the type of data analytics is the moving trajectory analytics, the monitoring event is to monitor location information of the UE to be monitored, and the monitoring device is configured to: monitor, by the AMF, the location information of the UE to be monitored according to the monitoring event.

In one embodiment, if the type of data analytics is the service traffic analytics, the monitoring event is to monitor traffic information of the UE to be monitored, and the monitoring device is configured to: monitor, by the SMF or the UPF, the traffic information of the UE to be monitored according to the monitoring event.

On the seventh aspect, an embodiment of this application provides a computer device, including a processor, wherein the steps of the method as shown on the first aspect are implemented when the processor is configured to execute a computer program stored in a memory.

On the eighth aspect, an embodiment of this application provides a readable storage medium, storing a computer program, wherein the steps of the method as shown on the first aspect are implemented when the computer program is executed by the processor.

In the embodiments of this application, the NWDAF may determine the UE to be monitored for which network data analytics is required, and the type of data analytics for the UE to be monitored; and determine the provider network function and the monitoring event for the UE according to the type of data analytics, the provider network function provides source data, corresponding to the type of data analytics, of the UE to be monitored, and the monitoring event indicates the provider network function to monitor the source data, in this way, after the NWDAF transmits the monitoring event to the provider network function, the provider network function may detect and even report the source data, corresponding to the type of data analytics, of the UE to be monitored according to the monitoring event, to realize monitoring for data of specific UE except for loads of network slices, so that the range that the network data is monitored by the NWDAF is widened, it is beneficial to the later adoption of corresponding control policies according to monitored data, and furthermore, the network data analytics capacity of a mobile communication network is improved.

BRIEF DESCRIPTION OF THE DRAWINGS

Embodiments of this application are described in the accompanying drawings shown introduced below. Apparently, the accompanying drawings described below show only some embodiments of this application.

DETAILED DESCRIPTION OF THE EMBODIMENTS

Embodiments of this application will be further described in detail below in conjunction with the accompanying drawings. Apparently, the described embodiments are only a part, but not all, of the embodiments of this application.

Embodiments of this disclosure may be used for a mobile network system such as a 5G network.

Firstly, a network functional structure applied in the embodiments herein is introduced in conjunction with the accompanying drawings.

Figure 1:
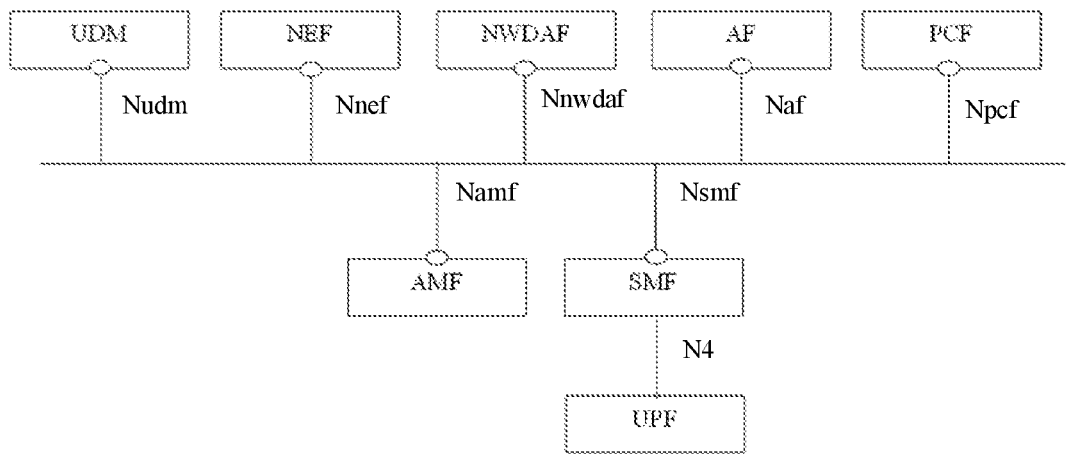
FIG. 1 is a structural schematic diagram of a network system in an embodiment of this application.

As shown in FIG. 1 which is a network functional structure applied in a method for monitoring network data, the network function may include a network layer and a user plane layer, wherein the network layer may include functions such as a NWDAF, a unified data management (UDM), a network exposure function (NEF), an application function (AF) and a policy control function (PCF); and the user plane layer may include a user plane function (UPF), an access and mobility management function (AMF), a session management function (SMF) and the like, and the functions of the user plane layer may be connected with a user equipment (UE) by a base station and the like. All the functions in a mobile network are connected by corresponding network interfaces.

In a practical application, data of the UE may interact with an external data network by virtue of a UPF, the AMF may be configured to take charge of a control plane network node of mobility management and is connected with a user terminal and an access network, and the SMF is configured to take charge of a control plane network node of session management and is connected with the UPF. The PCF is configured to perform policy control, the NEF is configured to perform interaction with a third-party application and expose network capability, the UDM is configured to take charge of storage and management of user data, and the NWDAF is a network analytics function of operator management and provides slice-related network data analytics to the PCF.

Embodiments of this application are introduced below in conjunction with the accompanying drawings of the specification. In the following introduction process, an example in which the embodiments of this application are applied to the network functional structure as shown in FIG. 1 is shown.

Figure 2:
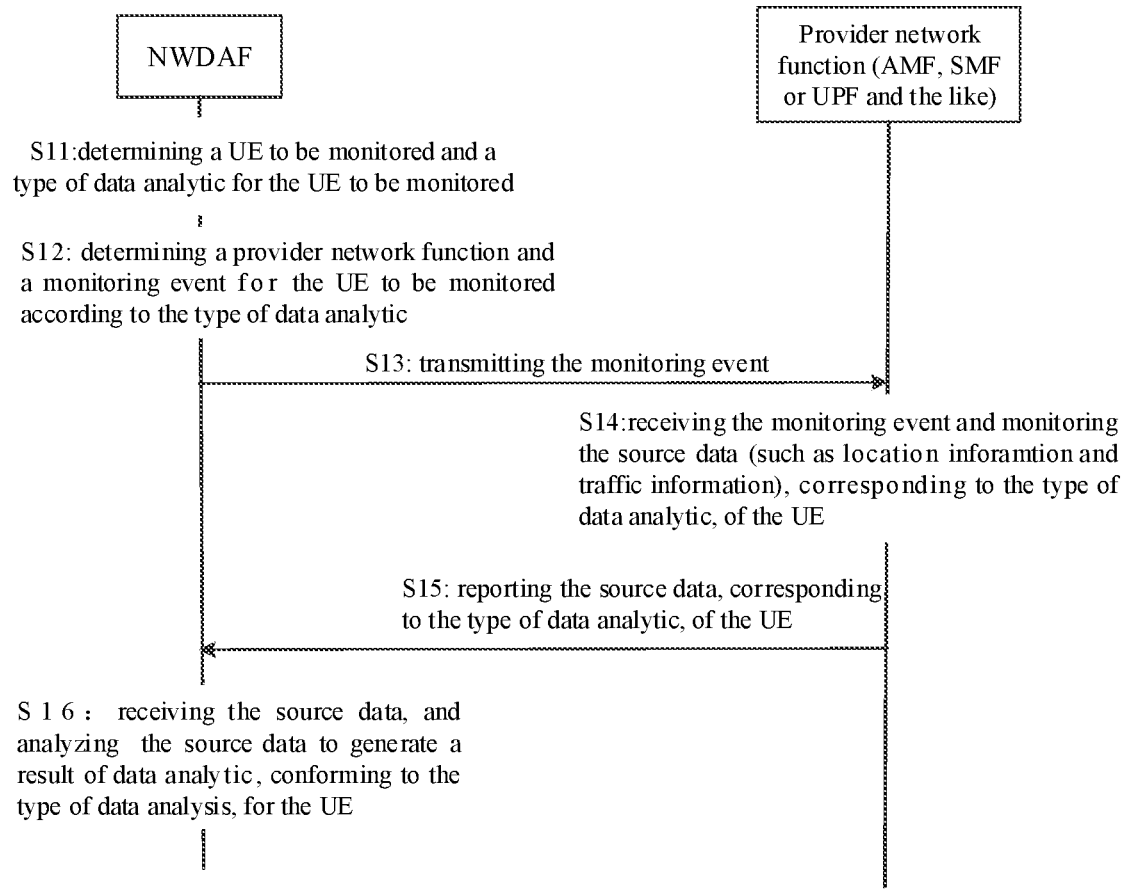
FIG. 2 is a flow schematic diagram of the method for monitoring network data in an embodiment of this application.

As shown in FIG. 2, an embodiment of this application provides a method for monitoring network data, the method may be applied to a mobile network system, for example, in a network system as shown in FIG. 1, the method may be executed by a corresponding network function in the network system. The processes of the method are described as follows.

S11: a NWDAF determines a UE to be monitored for which network data analytics is required, and a type of data analytics for the UE to be monitored.

In the embodiment of this application, the NWDAF determines the UE to be monitored for which the network data analytics is required, and a type of data analytics corresponding to a requirement of data analytics, according to a UE identity and the requirement of data analytics configured by a static configuration, or according to a UE identity and the requirement of data analytics carried by a request of data analytics from a network function. Unless otherwise specified, "UE" mentioned in the subsequent content herein may refer to the UE to be monitored.

In a practical application, types of data analytics corresponding to different demands of data analytics are generally different. In the embodiment of this application, the types of data analytics may include moving trajectory analytics, service traffic analytics and the like.

S12: the NWDAF determines a provider network function and a monitoring event for the UE to be monitored according to the type of data analytics, wherein the provider network function provides source data, corresponding to the type of data analytics, of the UE to be monitored, and the monitoring event indicates the provider network function to monitor the source data.

In the embodiment of this application, after the NWDAF determines the UE for which the data analytics is required and the type of data analytics, on one hand, the NWDAF can determine the monitoring event corresponding to the type of data analytics, i.e., the UE-related data to be monitored or collected, the monitoring event can be an event subscribed by the NWDAF to a network function providing the data, which indicates the data corresponding to the type of data analytics to be collected, for example, could be location information or data traffic information.

On the other hand, the NWDAF may also determine the provider network function for providing the source data corresponding to the type of data analytics for the UE according to the type of data analytics, and the UE is the UE required to acquire the source data indicated by the UE identity. The provider network function in the embodiment of this application may be any one or more of the AMF, the SMF, a next generation-radio access network (NG-RAN) and the UPF. For example, if the source data is the location information of the UE, the provider network function may be the AMF taking charge of the mobility management, or if the source data is the traffic information of the UE, the provider network function may be the SMF for the session management and the UPF connected with the SMF.

In a practical application, after the NWDAF signs a contract with the provider network function for a corresponding monitoring event, the provider network function may be indicated to monitor, acquire and even report the source data, related to a data type, of specific UE in slices.

S13: the NWDAF transmits the monitoring event to the provider network function.

In the embodiment of this application, when the NWDAF transmits the monitoring event to the provider network function, the following manners may be adopted, but are not limited.

Manner 1: the NWDAF may transmit the monitoring event to the UDM or the PCF, and furthermore, the UDM or the PCF transmits the monitoring event to the provider network function.

For example, the NWDAF may transmit a monitoring event that the location information of the UE is monitored to the UDM or the PCF, and the UDM or the PCF further transmits the monitoring event to the AMF which serves for the UE, to monitor the location information of the UE.

Manner 2: the NWDAF may also transmit the monitoring event to the NEF, then, the NEF transmits the monitoring event to the UDM or the PCF, and furthermore, the UDM or the PCF transmits the monitoring event to the provider network function.

For example, the NWDAF may also transmit a monitoring event that the location information of the UE is monitored to the NEF; the NEF further transmits, the event that the location information of the UE is monitored, through the UDM or the PCF; and the UDM or the PCF further transmits the monitoring event to the AMF which serves for the UE, to monitor the location information of the UE.

In a practical application, the NWDAF may also transmit an address (a NWDAF address) or an equipment identity of the NWDAF while transmitting the monitoring event (in manner 1 or 2, for example), so that the provider network function may directly report the acquired source data to the NWDAF later according to the NWDAF address or the equipment identity. Of course, the NWDAF may also transmit the UE identity of the UE to be monitored, or the UE identity may also be carried in the monitoring event.

S14: the provider network function receives the monitoring event and monitors the source data, corresponding to the type of data analytics, of the UE to be monitored according to the monitoring event.

In the embodiment of this application, the NWDAF may transmit the monitoring event to the UDM or the PCF directly or through the NEF, and then, the UDM or the PCF transmits the monitoring event to the provider network function, so that the provider network function may receive the monitoring event from the NWDAF by communication of the communicating UDM or PCF.

For example, the provider network function receives the monitoring event from the NWDAF through the UDM or the PCF, or the provider network function receives the monitoring event from the NEF through the UDM or the PCF, wherein the monitoring event in the NEF is an event transmitted by the NWDAF.

Furthermore, the provider network function may monitor the source data, corresponding to the type of data analytics, of the UE according to the monitoring event. For example, the AMF monitors the position of the UE in real time, or the SMF monitors service traffic such as the traffic rate of the UE.

S15: the provider network function reports the source data, corresponding to the type of data analytics, of the UE to be monitored to the NWDAF.

After monitoring the source data, corresponding to the type of data analytics, of the UE according to the monitoring event, the provider network function may report the monitored source data of the UE according to an analytics demand. For example, the provider network function may report the source data of the UE to the NWDAF when a monitoring condition is met, for example, the provider network function monitors the change of the position or the traffic rate of the UE.

In a practical application, the provider network function may report the monitored source data of the UE in real time or at intervals. For example, if the UE is in a moving state, the position of the UE is continuously changed, then, the AMF serving for the UE may report the position, such as the changed position, of the UE in real time. Or if the UE is in a semi-moving state, for example, the UE is in the moving state and a static state in turns, the position of the UE may be discontinuously changed, and thus, the changed position of the UE may be reported. Of course, it is also necessary to set an interval time according to a monitoring demand, and the provider network function may report the source data of the UE once every other the interval time.

In the embodiment of this application, when reporting the monitored source data, corresponding to the type of data analytics, of the UE, the provider network function may reversely transmit the source data of the UE according to a transmission path of the received monitoring event and report the source data to the NWDAF.

For example, the source data of the UE may be transmitted to the UDM or the PCF by the provider network function and then reported to the NWDAF by the UDM or the PCF. Or the provider network function transmits the source data of the UE to the UDM or the PCF, then the UDM or the PCF transmits the source data to the NEF, and then the NEF reports the source data to the NWDAF.

In another embodiment of this application, if the NWDAF further transmits the NWDAF address/equipment identity to the provider network function while transmitting the monitoring event in step S13, the provider network function may directly transmit the source data, corresponding to the type of data analytics, of the UE to the NWDAF according to the NWDAF address and/or equipment identity in step S15.

For example, if the provider network function is the AMF, the AMF may directly transmit the position of the UE monitored in real time to the NWDAF according to the NWDAF address and/or equipment identity, so that the transmission path is shortened, and the rate of reporting the network data is increased.

Or, in another embodiment of this application, if the NWDAF transmits the monitoring event in manner 2 and the NEF also carries an NEF address/equipment identity of the NEF while transmitting the monitoring event to the provider network function in step S13, the source data, corresponding to the type of data analytics, of the UE may be directly transmitted to the NEF by the provider network function according to the NEF address and/or equipment identity of the NEF and then the source data is reported to the NWDAF by the NEF in step S15.

S16: the NWDAF receives the source data, corresponding to the type of data analytics and reported by the provider network function, of the UE to be monitored, and analyzes and processes the received source data to generate a result of data analytics, conforming to the type of data analytics, for the UE.

The source data of the UE, received by the NWDAF, may be the source data, directly reported by the provider network function and corresponding to the type of data analytics, of the UE to be monitored, such as the traffic information directly reported by the SMF according to the NWDAF address.

Or, the source data of the UE, received by the NWDAF, may be source data which is not directly reported by the provider network function. Such a manner includes two situations as follows.

Situation 1: the NWDAF receives the source data, corresponding to the type of data analytics and reported by the provider network function through the UDM or the PCF, of the UE. For example, the NWDAF receives the location information of the UE, reported by the AMF through the UDM or the PCF.

Situation 2: the NWDAF receives the source data, corresponding to the type of data analytics and reported by the NEF, of the UE after the source data is directly reported to the NEF by the provider network function through the UDM or the PCF. For example, the NWDAF receives the location information of the UE, reported by the NEF after the location information is directly reported to the NEF by the AMF through the UDM or the PCF.

Further, the NWDAF analyzes and processes the received source data to obtain a result of data analytics corresponding to the type of data analytics.

For example, if the type of data analytics is the moving trajectory analytics for the UE, the AMF serving for the UE monitors the reported source data as the location information of the UE, the NWDAF analyzes and processes the location information, and thus, a mobility pattern corresponding to the UE may be obtained. Or, if the type of data analytics is the service traffic analytics for the UE, the SMF or the UPF serving for the UE monitors the reported source data as one or more pieces of service traffic information of the UE, the NWDAF analyzes and processes the traffic information, and thus, a service traffic model corresponding to the UE may be obtained.

Therefore, the embodiment of this application, the function of the NWDAF is enhanced, the capability of analyzing big data of network is improved, data collection and analytics for the specific UE are realized, and a network is enabled to provide better service to meet the demand of the specific UE.

Application scenarios of the embodiment of this application are further described below through examples and accompanying drawings.

Scenario 1

In this scenario, the NWDAF determines to need to analyze and acquire a mobility pattern of certain UE according to a static configuration or a request of a network function node, for example, the network function node may be the PCF or any one network function node in a network.

Therefore, the NWDAF needs to monitor and acquire location information of the UE, and analyzing the mobility pattern of the UE.

Then, the NWDAF may transmit an event for monitoring the location information of the UE to the UDM or the PCF, and the UDM or the PCF further transmits the monitoring event to the AMF which serves for the UE, to monitor the location information of the UE. When the position of the UE is changed, the AMF may directly report a position report to the NWDAF, or the AMF reports the position report of the UE to the NWDAF through the UDM or the PCF.

Or, the NWDAF may also transmit the event for monitoring the location information of the UE to the NEF, and the NEF further transmits the event for monitoring the location information of the UE through the UDM or the PCF, and the UDM or the PCF further transmits the monitoring event to the AMF serving for the UE, to monitor the location information of the UE. Then, when the position of the UE is changed, a position report may be directly reported to the NEF by the AMF and further reported to the NWDAF by the NEF, or the position report of the UE may be reported to the NEF by the AMF through the UDM or the PCF and further reported to the NWDAF by the NEF, so that the NWDAF performs analytics according to the acquired position data of the UE to obtain the mobility pattern of the specific UE.

Figure 3A:
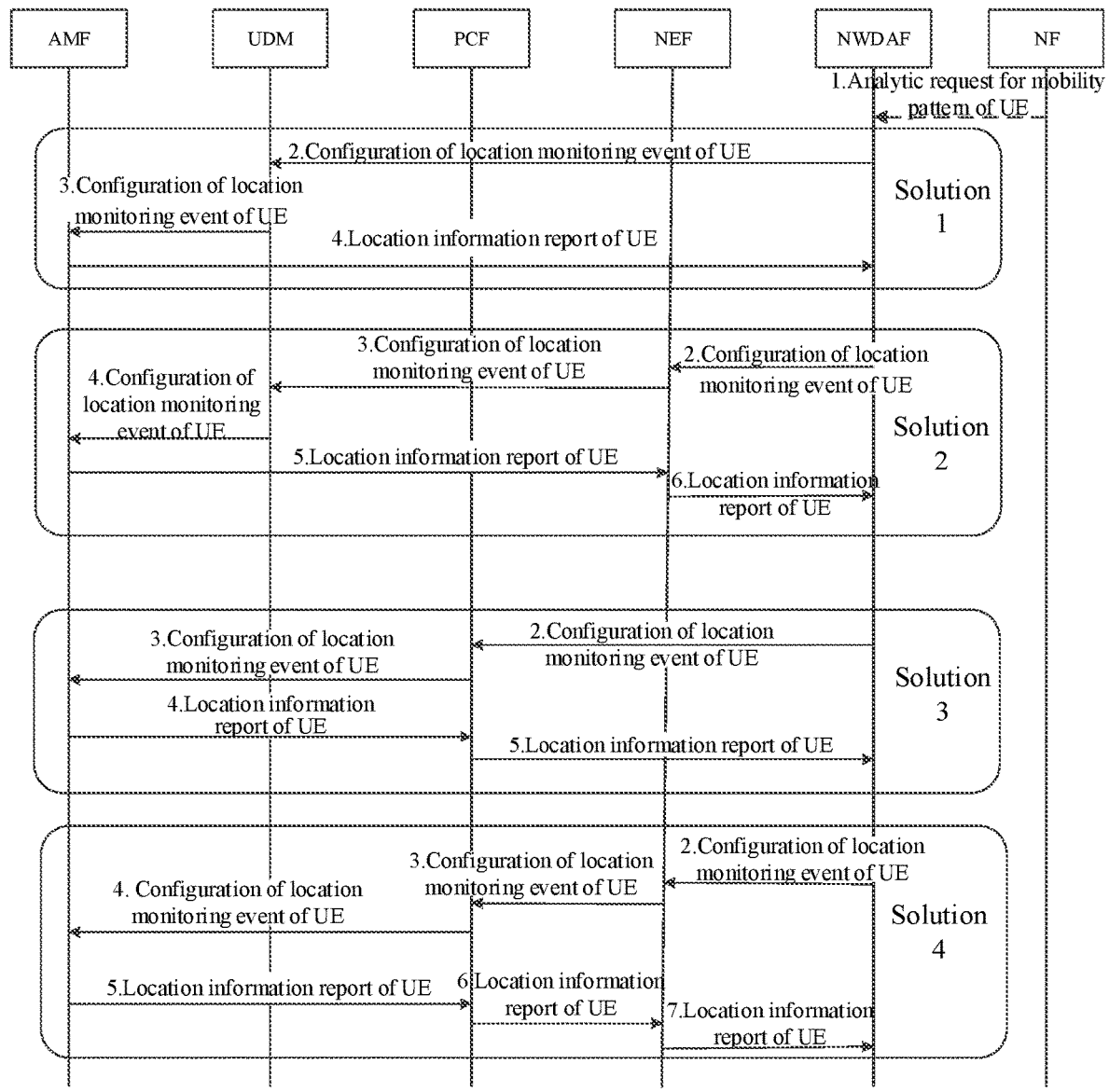
FIG. 3A to FIG. 3B are flow schematic diagrams of the method for monitoring network data in the embodiment of this application.

As shown in FIG. 3A, a schematic diagram of interaction between the NWDAF and the AMF (the provider network function) through different transmission paths is shown. In other words, after determining that the type of data analytics is the moving trajectory analytics, the NWDAF may interact with the AMF serving for the position data of the UE by adopting any one of four solutions as shown in the figure. All the solutions in the embodiment are briefly introduced below in conjunction with FIG. 3A.

Step 1: the NWDAF determines to need to analyze and acquire a service traffic model of certain UE or a service traffic model of a certain specific service of the UE according to a static configuration or a request of a network function node, for example, the network function node may be the PCF or any one network function node in a network. Therefore, the NWDAF determines to continuously acquire traffic information of the UE or traffic information of the certain specific service of the UE, to analyze the service traffic model of the UE or the service traffic model of the certain specific service of the UE.

Solution 1:

Step 2: the NWDAF transmits a UE identity and a location information monitoring event to the UDM.

Step 3: the UDM determines the AMF serving for the UE according to the UE identity and transmits the UE identity and the location information monitoring event to the AMF, In one embodiment, a NWDAF address or identity information may also be included.

Step 4: the AMF monitors the position of the UE, when the position of the UE is changed, location information of the UE may be reported to the UDM by the AMF and further reported to the NWDAF by the UDM. Or, if receiving the NWDAF address or identity information in step 3, the AMF may directly report the location information of the UE to the NWDAF.

Solution 2:

Step 2: the NWDAF transmits a UE identity and a location information monitoring event to the NEF.

Step 3: the NEF transmits the UE identity and the location information monitoring event to the UDM.

Step 4: the UDM determines the AMF serving for the UE according to the UE identity and transmits the UE identity and the location information monitoring event to the AMF, In one embodiment, an NEF address or identity information may also be included.

Step 5: the AMF monitors the position of the UE, when the position of the UE is changed, location information of the UE may be reported to the UDM by the AMF and further reported to the NEF by the UDM. Or, if receiving the NEF address or identity information in step 4, the AMF may directly report the location information of the UE to the NEF.

Step 6: the NEF reports the location information of the UE to the NWDAF.

Solution 3:

Step 2: the NWDAF transmits a UE identity and a location information monitoring event to the PCF.

Step 3: the PCF determines the AMF serving for the UE according to the UE identity and transmits the UE identity and the location information monitoring event to the AMF, In one embodiment, a NWDAF address or identity information may also be included.

Step 4: the AMF monitors the position of the UE, when the position of the UE is changed, location information of the UE may be reported to the PCF by the AMF. Or, if receiving the NWDAF address or identity information in step 3, the AMF may directly report the location information of the UE to the NWDAF.

Step 5: if the AMF reports the location information of the UE to the PCF, the PCF reports the location information of the UE to the NWDAF.

Solution 4:

Step 2: the NWDAF transmits a UE identity and a location information monitoring event to the NEF.

Step 3: the NEF transmits the UE identity and the location information monitoring event to the PCF.

Step 4: the PCF determines the AMF serving for the UE according to the UE identity and transmits the UE identity and the location information monitoring event to the AMF, In one embodiment, an NEF address or identity information may also be included.

Step 5: the AMF monitors the position of the UE, when the position of the UE is changed, the AMF may report location information of the UE to the PCF. Or, if receiving the NEF address or identity information in step 4, the AMF may directly report the location information of the UE to the NEF.

Step 6: if the AMF reports the location information of the UE to the PCF, the PCF reports the location information of the UE to the NEF.

Step 7: the NEF reports the location information of the UE to the NWDAF.

Furthermore, the NWDAF may perform analytics according to the acquired position data of the UE to acquire the mobility pattern of the UE.

Scenario 2

In this scenario, the NWDAF determines to need to analyze and acquire a service traffic model of certain UE according to a static configuration or a request of a network function node, for example, the network function node may be the PCF or any one network function node in a network.

Therefore, the NWDAF determines to need to monitor traffic information of the UE, and analyzing a service traffic model of the UE.

Then, the NWDAF may transmit an event for monitoring the traffic information of the UE to the UDM or the PCF, the UDM or the PCF further transmits the monitoring event to the SMF serving for the UE, and the SMF further transmits the monitoring event to the UPF, so that the traffic information of the UE is monitored. When the traffic information of the UE is changed, the SMF acquires a traffic information report from the UPF, the SMF may directly report the traffic information report to the NWDAF, or the SMF reports the traffic information of the UE to the NWDAF through the UDM or the PCF.

Or, the NWDAF may also transmit the event for monitoring the traffic information of the UE to the NEF, and the NEF further transmits the event for monitoring the traffic information of the UE through the UDM or the PCF, the UDM or the PCF further transmits the monitoring event to the SMF serving for the UE, and the SMF further transmits the monitoring event to the UPF, so that the traffic information of the UE is monitored. When the traffic information of the UE is changed, the SMF acquires a traffic information report from the UPF, the traffic information report may be directly reported to the NEF by the SMF and further reported to the NWDAF by the NEF; or the traffic information report of the UE is reported to the NEF by the SMF through the UDM or the PCF and is further reported to the NWDAF by the NEF, so that the NWDAF performs analytics according to the acquired traffic data of the UE to acquire the service traffic model of certain UE.

Figure 3B:
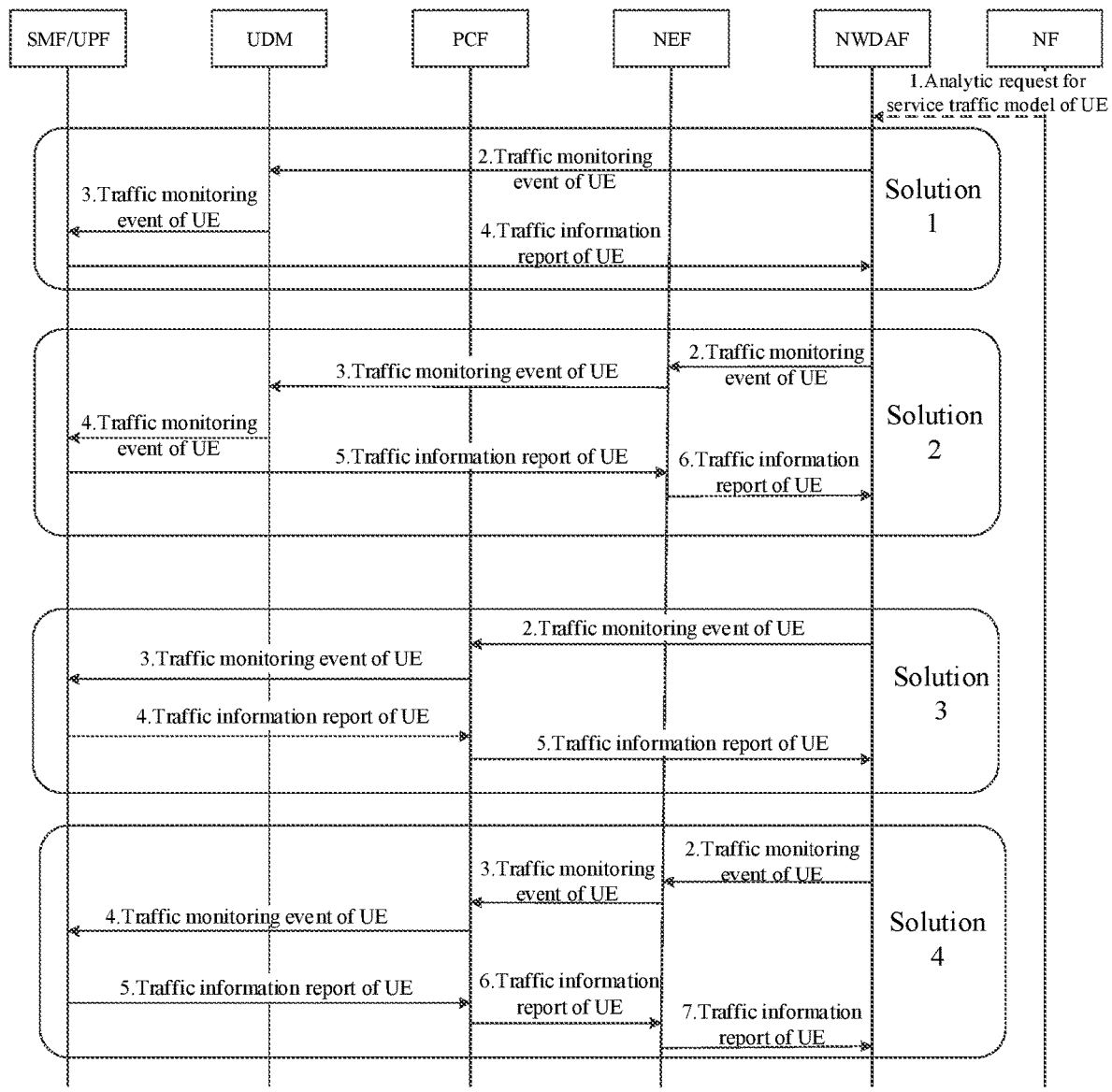

As shown in FIG. 3B, a schematic diagram of interaction between the NWDAF and the SMF (the provider network function) through different transmission paths is shown.

After determining that the type of data analytics is the moving trajectory analytics, the NWDAF may interact with the SMF serving for position data of the UE by adopting any one of four solutions as shown in the figure. various solutions in the embodiment are briefly introduced below in conjunction with FIG. 3B.

Step 1: the NWDAF determines to need to analyze and acquire a service traffic model of certain UE or a service traffic model of a certain specific service of the UE according to a static configuration or a request of a network function node, for example, the network function node may be the PCF or any one network function node in a network. Therefore, the NWDAF determines to continuously acquire traffic information of the UE or traffic information of the certain specific service of the UE, to analyze the service traffic model of the UE or the service traffic model of the certain specific service of the UE.

Solution 1.

Step 2: the NWDAF transmits a UE identity and a traffic information monitoring event to the UDM. In one embodiment, service identity information may also be included and configured to monitor traffic information of a specific service.

Step 3: the UDM determines the SMF serving for the UE according to the UE identity and transmits the UE identity and the traffic information monitoring event to the SMF, In one embodiment, the service identity information is further included and configured to monitor the traffic information of the specific service. In one embodiment, a NWDAF address or identity information may also be included.

Step 4: the SMF further interacts with the UPF to monitor the traffic of the UE, if a service identity is included in step 3, the traffic information of the specific service is monitored; and when the traffic of the UE or the traffic of the specific service of the UE is changed, traffic information of the UE may be reported to the UDM by the SMF and further reported to the NWDAF by the UDM. Or, if receiving the NWDAF address or identity information in step 3, the SMF may directly report the traffic information of the UE to the NWDAF. If the SMF transmits the NWDAF address or identity information in step 3 to the UPF, the UPF may also directly report the traffic information to the NWDAF.

Solution 2.

Step 2: the NWDAF transmits a UE identity and a traffic information monitoring event to the NEF. In one embodiment, service identity information is further included and configured to monitor traffic information of a specific service.

Step 3: the NEF transmits the UE identity and the location information monitoring event to the UDM. In one embodiment, the service identity information is also included and configured to monitor the traffic information of the specific service.

Step 4: the UDM determines the SMF serving for the UE according to the UE identity and transmits the UE identity and the traffic information monitoring event to the SMF, In one embodiment, the service identity information is also included and configured to monitor the traffic information of the specific service. In one embodiment, a NEF address or identity information may also be included.

Step 5: the SMF further interacts with the UPF to monitor the traffic of the UE, if a service identity is included in step 4, the traffic information of the specific service is monitored; and when the traffic of the UE or the traffic of the specific service of the UE is changed, traffic information of the UE may be reported to the UDM by the SMF and further reported to the NEF by the UDM. Or, if receiving the NEF address or identity information in step 4, the SMF may directly report the traffic information of the UE to the NEF. If the SMF transmits the NEF address or identity information in step 4 to the UPF, the UPF may also directly report the traffic information to the NEF.

Step 6: the NEF reports the location information of the UE to the NWDAF.

Solution 3.

Step 2: the NWDAF transmits a UE identity and a traffic information monitoring event to the PCF. In one embodiment, service identity information may also be included and configured to monitor traffic information of a specific service.

Step 3: the PCF determines the SMF serving for the UE according to the UE identity and transmits the UE identity and the traffic information monitoring event to the SMF, and In one embodiment, the service identity information is also included and configured to monitor the traffic information of the specific service. In one embodiment, a NWDAF address or identity information may also be included.

Step 4: the SMF further interacts with the UPF to monitor the traffic of the UE, if a service identity is included in step 3, the traffic information of the specific service is monitored; and when the traffic of the UE or the traffic of the specific service of the UE is changed, the SMF may report traffic information of the UE to the PCF. Or, if receiving the NWDAF address or identity information in step 3, the SMF may directly report the traffic information of the UE to the NWDAF. If the SMF transmits the NWDAF address or identity information in step 3 to the UPF, the UPF may also directly report the traffic information to the NWDAF.

Step 5: if the SMF reports the traffic information of the UE to the PCF, the PCF reports the traffic information of the UE to the NWDAF.

Solution 4.

Step 2: the NWDAF transmits a UE identity and a location information monitoring event to the NEF. In one embodiment, service identity information may also be included and configured to monitor traffic information of a specific service.

Step 3: the NEF transmits the UE identity and the location information monitoring event to the PCF. In one embodiment, the service identity information is included and configured to monitor traffic information of a specific service.

Step 4: the PCF determines the SMF serving for the UE according to the UE identity and transmits the UE identity and the traffic information monitoring event to the SMF, and In one embodiment, the service identity information is also included and configured to monitor the traffic information of the specific service. In one embodiment, a NEF address or identity information may also be included.

Step 5: the SMF further interacts with the UPF to monitor the traffic of the UE, if a service identity is included in step 4, the traffic information of the specific service is monitored; and when the traffic of the UE or the traffic of the specific service of the UE is changed, the SMF may report traffic information of the UE to the PCF. Or, if receiving the NEF address or identity information in step 4, the SMF may directly report the traffic information of the UE to the NEF. If the SMF transmits the NEF address or identity information in step 4 to the UPF, the UPF may also directly report the traffic information to the NEF.

Step 6: if the SMF reports the traffic information of the UE to the PCF, the PCF reports the traffic information of the UE to the NEF.

Step 7: the NEF reports the traffic information of the UE to the NWDAF.

Furthermore, the NWDAF may perform analytics according to the acquired traffic data of the UE to acquire the service traffic model of certain UE.

Embodiment 2

Figure 4A:
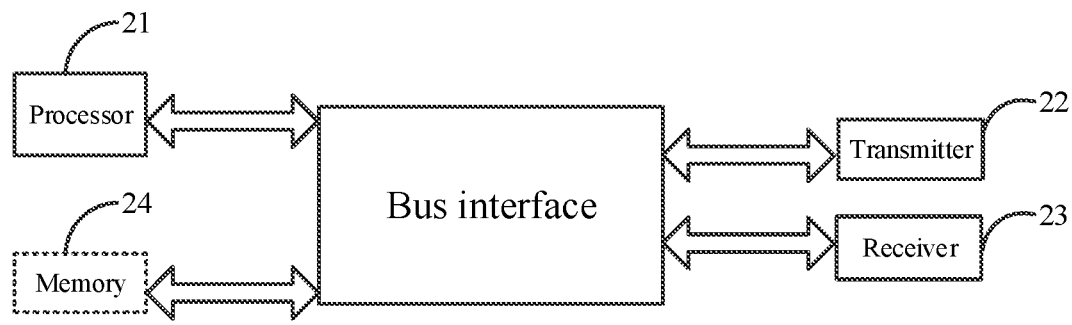
FIG. 4A to FIG. 4B are structural schematic diagrams of the monitoring device in an embodiment of this application.

Based on the same inventive concept, an embodiment of this application provides a monitoring device which may be a NWDAF in a network system as shown in FIG. 1. As shown in FIG. 4A, the monitoring device may include a processor 21 and a transmitter 22.

In one embodiment, the monitoring device may also include a receiver 23 which is simultaneously shown in FIG. 4A, and all the components may communicate by a bus. In a practical application, the receiver 23 and the transmitter 22 may be arranged in a transceiver.

In addition, the monitoring device may further include a memory 24 shown by dotted lines in FIG. 4A. The memory 24 may be configured to store various data, such as data to be analyzed and a result of data analytics, in the monitoring device.

In one embodiment, the processor is configured to determine a UE to be monitored for which network data analytics is required, and a type of data analytics for the UE to be monitored; and determine a provider network function and a monitoring event for the UE to be monitored according to the type of data analytics for the UE to be monitored, wherein the provider network function provides source data, corresponding to the type of data analytics, of the UE to be monitored, and the monitoring event indicates the provider network function to monitor the source data; and the transmitter is configured to transmit the monitoring event to the provider network function.

In the embodiment of this application, the provider network function includes any one or more of an AMF, a SMF, a NG-RAN and a UPF, and the type of data analytics includes moving trajectory analytics and/or service traffic analytics.

In one embodiment, the monitoring device further includes:

a receiver, configured to receive the source data, corresponding to the type of data analytics and reported by the provider network function according to the monitoring event, of the UE to be monitored, after the monitoring event is transmitted to the provider network function; and the processor, configured to analyze the received source data to generate a result of data analytics, conforming to the type of data analytics, for the UE to be monitored.

In one embodiment, the processor is configured to:

determine the UE to be monitored for which the network data analytics is required and the type of data analytics corresponding to a requirement of data analytics according to a UE identity and the requirement of data analytics indicated in a request of data analytics received from a network function, or a static configuration.

In one embodiment, the transmitter is configured to:

transmit the monitoring event to a UDM or a PCF, or transmit the monitoring event to a NEF to transmit the monitoring event to the UDM or the PCF by the NEF, so that the UDM or the PCF transmits the monitoring event to the provider network function.

In one embodiment, the transmitter is further configured to: transmit a NWDAF address and/or an equipment identity of the NWDAF to the provider network function while transmitting the monitoring event to the provider network function; and the receiver is configured to: receive the source data, corresponding to the type of data analytics and directly transmitted to the NWDAF by the provider network function, of the UE to be monitored according to the NWDAF address and/or the equipment identity.

In one embodiment, the receiver is configured to:
receive the source data, corresponding to the type of data analytics and reported by the provider network function through the UDM or the PCF, of the UE to be monitored, or
receive the source data, corresponding to the type of data analytics and reported by the NEF, of the UE to be monitored after the source data is reported to the NEF by the provider network function through the UDM or the PCF.

In one embodiment, the provider network function includes any one or more of the AMF, the SMF, the NG-RAN and the UPF.

In one embodiment, the type of data analytics includes moving trajectory analytics and/or service traffic analytics.

In one embodiment, if the type of data analytics is the moving trajectory analytics, the monitoring event is to monitor location information of the UE to be monitored,
the transmitter is configured to: transmit the monitoring event to the AMF for monitoring and/or reporting the location information of the UE to be monitored; and
the processor is configured to: analyze the received location information of the UE to be monitored to generate the result of data analytics of a mobility pattern corresponding to the UE to be monitored.

In one embodiment, if the type of data analytics is the service traffic analytics, the monitoring event is to monitor traffic information of the UE to be monitored, then, the transmitter is configured to: transmit the monitoring event to the SMF or the UPF for monitoring and/or reporting the traffic information of the UE to be monitored; and the processor is configured to: analyze the received traffic information of the UE to be monitored to generate the result of data analytics of a service traffic model corresponding to the UE to be monitored.

Embodiment 3

Figure 4B:
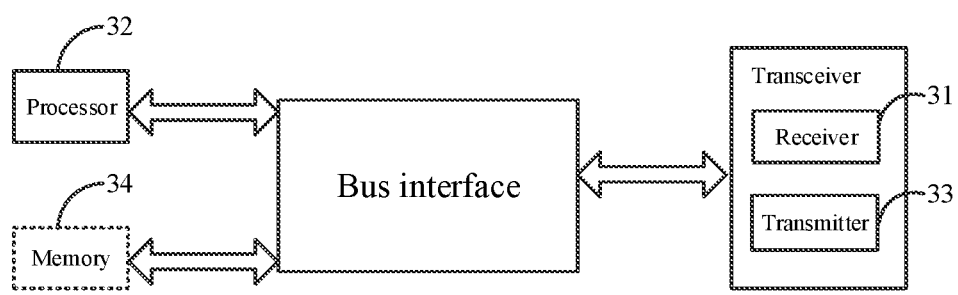

Based on the same inventive concept, an embodiment of this application provides a monitoring device which may be a provider network function, such as an AMF, a SMF, a NG-RAN or a UPF, serving for UE in a network system as shown in FIG. 1. As shown in FIG. 4B, the monitoring device may include a receiver 31 and a processor 32.

In one embodiment, the monitoring device may also include a transmitter 33 which is simultaneously shown in FIG. 4B, and all the components may communicate by a bus. In a practical application, the receiver 31 and the transmitter 33 may be arranged in a transceiver.

In addition, the monitoring device may further include a memory 34 shown by dotted lines in FIG. 4B. The memory 34 may be configured to store various data, such as acquired data of the UE, in the monitoring device.

In one embodiment, the receiver may be configured to receive a monitoring event from a NWDAF, wherein the monitoring event indicates the provider network function to monitor source data, corresponding to a type of data analytics, of the UE to be monitored, and the provider network function provides the source data, corresponding to the type of data analytics, of the UE to be monitored.

The processor may be configured to monitor the source data, corresponding to the type of data analytics, of the UE to be monitored according to the monitoring event.

In the embodiment of this application, the provider network function includes any one or more of the AMF, the SMF, the NG-RAN and the UPF, and the type of data analytics includes moving trajectory analytics and service traffic analytics.

In one embodiment, the transmitter is configured to report the source data, corresponding to the type of data analytics, of the UE to be monitored to the NWDAF after the processor monitors the source data, corresponding to the type of data analytics, of the UE to be monitored according to the monitoring event.

In one embodiment, the receiver is further configured to: receive a NWDAF address and/or an equipment identity of the NWDAF while receiving the monitoring event from the NWDAF; and the transmitter is configured to: directly transmit the source data to the NWDAF according to the NWDAF address and/or the equipment identity.

In one embodiment, the transmitter is configured to: report the source data, corresponding to the type of data analytics, of the UE to be monitored to the NWDAF through an UDM or a PCF; or report the source data to a NEF through the UDM or the PCF, to transmit the source data to the NWDAF by the NEF.

In one embodiment, if the type of data analytics is the moving trajectory analytics, the monitoring event is to monitor location information of the UE to be monitored, and the processor is configured to monitor the location information of the UE to be monitored according to the monitoring event.

In one embodiment, if the type of data analytics is the service traffic analytics, the monitoring event is to monitor traffic information of the UE to be monitored, and the processor is configured to monitor the traffic information of the UE to be monitored according to the monitoring event.

Embodiment 4

Figure 5A:
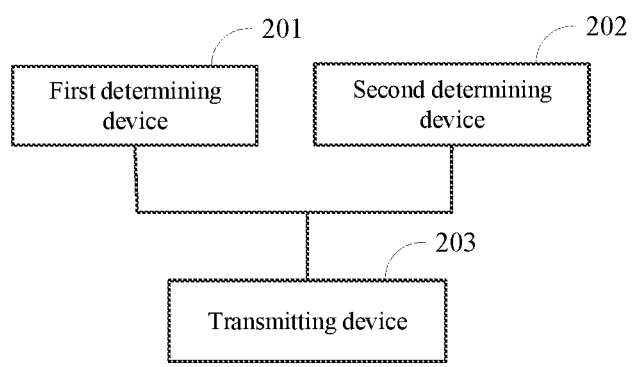
FIG. 5A to FIG. 5B are schematic diagrams of devices of the monitoring device in the embodiment of this application.

Based on the same inventive concept, an embodiment of this application provides a monitoring device which may be a NWDAF in a network system as shown in FIG. 1. FIG. 5A is a schematic diagram of devices of the monitoring device, and the monitoring device may include a first determining device 201, a second determining device 202 and a transmitting device 203.

The first determining device 201 is configured to determine a UE to be monitored for which network data analytics is required, and a type of data analytics for the UE to be monitored;

the second determining device 202 is configured to determine a provider network function and a monitoring event for the UE to be monitored according to the type of data analytics for the UE to be monitored, wherein the provider network function provides source data, corresponding to the type of data analytics, of the UE to be monitored, and the monitoring event indicates the provider network function to monitor the source data; and the transmitting device 203 is configured to transmit the monitoring event to the provider network function.

In one embodiment, the monitoring device further includes:
a receiving device, configured to receive the source data, reported by the provider network function according to the monitoring event and corresponding to the type of data analytics, of the UE to be monitored; and
a processing device, configured to analyze the received source data to generate a result of data analytics, conforming to the type of data analytics, for the UE to be monitored.

In one embodiment, the first determining device 201 is configured to: determine the UE to be monitored for which the network data analytics is required and the type of data analytics corresponding to a requirement of data analytics according to a UE identity and the requirement of data analytics indicated in a request of data analytics received from a network function, or a static configuration.

In one embodiment, the transmitting device 203 is configured to:

transmit the monitoring event to an UDM or a PCF; or transmit the monitoring event to a NEF to transmit the monitoring event to the UDM or the PCF by the NEF, so that the UDM or the PCF transmits the monitoring event to the provider network function.

In one embodiment, the transmitting device 203 is further configured to: transmit a NWDAF address and/or an equipment identity to the provider network function while transmitting the monitoring event to the provider network function; and the receiving device is configured to: receive the source data, corresponding to the type of data analytics and directly transmitted to the NWDAF by the provider network function, of the UE to be monitored according to the NWDAF address and/or the equipment identity.

In one embodiment, the receiving device is further configured to: receive the source data, corresponding to the type of data analytics and reported by the provider network function through the UDM or the PCF, of the UE to be monitored.

In one embodiment, the receiving device is further configured to: receive the source data, corresponding to the type of data analytics and reported by the NEF, of the UE to be monitored after the source data is reported to the NEF by the provider network function through the UDM or the PCF.

In one embodiment, the provider network function includes any one or more of an AMF, a SMF, a NG-RAN and a UPF.

In one embodiment, the type of data analytics includes moving trajectory analytics and/or service traffic analytics.

In one embodiment, if the type of data analytics is the moving trajectory analytics, the monitoring event is to monitor location information of the UE to be monitored, the transmitting device 203 is configured to: transmit the monitoring event to the AMF for monitoring and/or reporting the location information of the UE to be monitored; and at the moment, the processing device is configured to: analyze the received location information of the UE to be monitored to generate the result of data analytics of a mobility pattern corresponding to the UE to be monitored.

In one embodiment, if the type of data analytics is the service traffic analytics, the monitoring event is to monitor traffic information of the UE to be monitored, the transmitting device 203 is configured to: transmit the monitoring event to the SMF or the UPF for monitoring and/or reporting the traffic information of the UE to be monitored; and at the moment, the processor is configured to: analyze the received traffic information of the UE to be monitored to generate the result of data analytics of a service traffic model corresponding to the UE to be monitored.

Embodiment 5

Figure 5B:
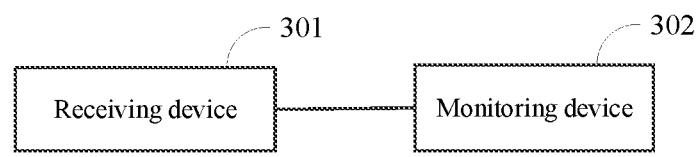

Based on the same inventive concept, an embodiment of this application provides a monitoring device which may be a provider network function, such as an AMF, a SMF, a NG-RAN or a UPF, serving for UE in a network system as shown in FIG. 1. FIG. 5B is a structural schematic diagram of the monitoring device, and the monitoring device may include a receiving device 301 and a monitoring device 302.

The receiving device 301 may be configured to receive a monitoring event from a NWDAF, wherein the monitoring event indicates the provider network function to monitor source data, corresponding to a type of data analytics, of the UE to be monitored, and the provider network function provides the source data, corresponding to the type of data analytics, of the UE to be monitored.

The monitoring device 302 is configured to monitor the source data, corresponding to the type of data analytics, of the UE to be monitored according to the monitoring event.

In one embodiment, the monitoring device further includes:

a transmitting device, configured to report the source data, corresponding to the type of data analytics, of the UE to be monitored to the NWDAF after the provider network function monitors the source data, corresponding to the type of data analytics, of the UE to be monitored according to the monitoring event.

In one embodiment, the receiving device 301 is further configured to: receive a NWDAF address and/or an equipment identity of the NWDAF while receiving the monitoring event from the NWDAF; and the transmitting device is configured to: directly transmit the source data to the NWDAF according to the NWDAF address and/or the equipment identity.

In one embodiment, the transmitting device is configured to: report the source data, corresponding to the type of data analytics, of the UE to be monitored to the NWDAF through an UDM or a PCF; or report the source data to a NEF through the UDM or the PCF, to transmit the source data to the NWDAF by the NEF.

In one embodiment, the provider network function includes any one or more of the AMF, the SMF, the NG-RAN and the UPF.

In one embodiment, the type of data analytics includes moving trajectory analytics and/or service traffic analytics.

In one embodiment, if the type of data analytics is the moving trajectory analytics, the monitoring event is to monitor location information of the UE to be monitored, and the monitoring device 302 is configured to: monitor, by the AMF, the location information of the UE to be monitored according to the monitoring event.

In one embodiment, if the type of data analytics is the service traffic analytics, the monitoring event is to monitor traffic information of the UE to be monitored, and the monitoring device 302 is configured to: monitor, by the SMF or the UPF, the traffic information of the UE to be monitored according to the monitoring event.

Embodiment 6

Figure 6:
FIG. 6 is a structural schematic diagram of a computer device in an embodiment of this application.

An embodiment of this application further provides a computer device with a structure as shown in FIG. 6, and the computer device includes a processor 10 and a memory 20, wherein the steps of the method provided in embodiment 1 of this application are implemented when the processor 10 is configured to execute a computer program stored in the memory 20.

In one embodiment, the processor 10 may be a central processing unit and an application specific integrated circuit (ASIC), may be one or more integrated circuits for controlling a program to be executed, may be a hardware circuit developed by using a field programmable gate array (FPGA) and may be a baseband processor.

In one embodiment, the processor 10 may include at least one processing core.

In one embodiment, electronic equipment further includes a memory 20, and the memory 20 may include a read only memory (ROM), a random access memory (RAM) and a magnetic disk memory. The memory 20 is configured to store data required when the processor 10 operates. One or more processors 20 may be provided.

Embodiment 7

An embodiment of this application further provides a computer readable storage medium in which a computer instrument is stored, and the steps of the method provided by embodiment 1 of this application may be implemented when the computer instruction operates on a computer.

In the embodiment of this application, it should be understood that the disclosed method and recognition device may be realized in other manners. For example, the embodiment of equipment described above is only schematic, for example, division of units is only logic function division, and the units may be divided in other manners during practical implementation, for example, units or components may be combined or integrated into another system, or some features may be ignored or not be executed. In addition, the displayed or discussed mutual coupling or direct coupling or communication connection may be realized by indirect coupling or communication connection realized by virtue of some interfaces, equipment or units and may be in an electric form or other forms.

All functional units in the embodiment of this application may be integrated into one processing unit, or each of the units may be an independent physical device.

When being implemented in a form of a software functional unit and used as independent products to be sold or used, the integrated units may be stored in a computer readable storage medium. Based on such understanding, all or parts of the embodiments of this application may be embodied in a form of a software product, the computer software product is stored in a storage medium and includes instructions for making one piece of computer equipment such as a personal computer, a server or network equipment or a processor execute all or parts of the steps of the method in each embodiment of this application. The above-mentioned storage medium includes various media to store program codes, such as a universal serial bus flash drive (USB), a mobile hard disk drive, a read-only memory (ROM), a random access memory (RAM), a magnetic disk or an optical disk.

Embodiments of this application may provide a method, system or computer program product. Therefore, forms of a complete hardware embodiment, a complete software embodiment or a software and hardware aspect combined embodiment may be adopted in this application. In addition, a form of the computer program product executed on one or more computer available storage media (including, but not limited to a magnetic disk memory, a CD-ROM, an optical memory and the like) including computer available program codes may be adopted in this application.

This application is described by referring to flow diagrams and/or block diagrams of the method, the equipment (system) and the computer program product according to the embodiments of this application. It should be understood that each flow and/or block in the flow diagrams and/or block diagrams as well as a combination of flows and/or blocks in the flow diagrams and/or block diagrams may be realized by virtue of computer program instructions. These computer program instructions may be provided for a general-purpose computer, a special-purpose computer, an embedded processor or processors of other programmable data processing equipment to generate a machine, so that a device for achieving specified functions in one or more flows in the flow programs and/or one or more blocks in the block diagrams is achieved through the instructions executed by the computer or the processors of other programmable data processing equipment.

These computer program instructions may also be stored in a computer readable memory to guide the computer or other programmable data processing equipment to work in a specific manner, so that the instructions stored in the computer readable memory generate a product including an instruction device, and the instruction device achieves the functions specified in the one or more flows in the flow diagrams and/or one or more blocks in the block diagrams.

These computer program instructions may also be loaded in the computer or other programmable data processing equipment, so that a series of operation steps are performed on the computer or other programmable data processing equipment to generate processing realized by the computer, and furthermore, the instructions executed on the computer or other programmable data processing equipment provide steps for achieving the specified functions in the one or more flows in the flow diagrams and/or one or more blocks in the block diagrams.

What is claimed is:

1. A method for monitoring network data, comprising:
   determining, by a network data analytics function (NWDAF), a user equipment (UE) to be monitored for which network data analytics is required, and a type of data analytics for the UE to be monitored;
   determining, by the NWDAF, a network function and a monitoring event for the UE according to the type of data analytics, wherein the network function provides data, corresponding to the type of data analytics, of the UE to be monitored, and the monitoring event indicates the network function to monitor the data; and
   transmitting, by the NWDAF, the monitoring event to the network function, wherein after transmitting, by the NWDAF, the monitoring event to the network function, the method further comprises:
   receiving, by the NWDAF, the data, reported by the network function according to the monitoring event and corresponding to the type of data analytics, of the UE to be monitored; and
   analyzing, by the NWDAF, the received data to generate a result of data analytics, conforming to the type of data analytics, for the UE to be monitored.

2. The method according to claim 1, wherein said determining, by the NWDAF, the UE to be monitored for which the network data analytics is required, and the type of data analytics for the UE to be monitored comprises:
   determining, by the NWDAF, the UE to be monitored for which the network data analytics is required and the type of data analytics corresponding to a requirement of data analytics according to a UE identity and the requirement of data analytics indicated in a request of data analytics received from a consumer network function, or a static configuration.

3. The method according to claim 1, wherein said transmitting, by the NWDAF, the monitoring event to the network function comprises:
   transmitting, by the NWDAF, the monitoring event to an unified data management (UDM) or a policy control function (PCF), to transmit the monitoring event to the network function by the UDM or the PCF.

4. The method according to claim 3, wherein said transmitting, by the NWDAF, the monitoring event to the UDM or the PCF comprises:

transmitting, by the NWDAF, the monitoring event to a network exposure function (NEF), to transmit the monitoring event to the UDM or the PCF by the NEF.

5. The method according to claim 1, wherein while transmitting, by the NWDAF, the monitoring event to the network function, the method further comprises:
    transmitting, by the NWDAF, a NWDAF address and/or an equipment identity of the NWDAF to the network function; and
    said receiving, by the NWDAF, the data, reported by the network function according to the monitoring event and corresponding to the type of data analytics, of the UE to be monitored comprises:
    receiving, by the NWDAF, the data, directly transmitted to the NWDAF by the network function according to the NWDAF address and/or the equipment identity and corresponding to the type of data analytics, of the UE to be monitored.

6. The method according to claim 3, wherein the receiving, by the NWDAF, of the data, reported by the network function according to the monitoring event and corresponding to the type of data analytics, of the UE to be monitored comprises:
    receiving, by the NWDAF, the data, reported by the network function through the UDM or the PCF and corresponding to the type of data analytics, of the UE to be monitored.

7. The method according to claim 4, wherein the receiving, by the NWDAF, of the data, reported by the network function according to the monitoring event and corresponding to the type of data analytics, of the UE to be monitored comprises:
    receiving, by the NWDAF, the data, reported by the NEF and corresponding to the type of data analytics, of the UE to be monitored, after the data is reported to the NEF by the network function through the UDM or the PCF.

8. The method according to claim 1, wherein the network function comprises any one or more of an access and mobility management function (AMF), a session management function (SMF), a next generation-radio access network function (NG-RAN) and a user plane function (UPF).

9. The method according to claim 8, wherein the type of data analytics comprises moving trajectory analytics and/or service traffic analytics.

10. The method according to claim 9, wherein when the type of data analytics is the moving trajectory analytics, the monitoring event is to monitor location information of the UE to be monitored, and
    said transmitting, by the NWDAF, the monitoring event to the network function comprises:
    transmitting, by the NWDAF, the monitoring event to the AMF for monitoring and/or reporting the location information of the UE to be monitored;
    wherein said analyzing, by the NWDAF, the received data to generate the result of data analytics, conforming to the type of data analytics, for the UE to be monitored comprises:
    analyzing, by the NWDAF, a received location information of the UE to be monitored to generate the result of data analytics of a mobility pattern corresponding to the UE to be monitored.

11. The method according to claim 9, wherein when the type of data analytics is the service traffic analytics, the monitoring event is to monitor traffic information of the UE to be monitored, and said transmitting, by the NWDAF, the monitoring event to the network function comprises:
    transmitting, by the NWDAF, the monitoring event to the SMF or the UPF for monitoring and/or reporting the traffic information of the UE to be monitored;
    wherein said analyzing, by the NWDAF, the received data to generate the result of data analytics, conforming to the type of data analytics, for the UE to be monitored comprises:
    analyzing, by the NWDAF, a received traffic information of the UE to be monitored to generate the result of data analytics of a service traffic model corresponding to the UE to be monitored.

12. A method for monitoring network data, comprising:
    receiving, by a network function, a monitoring event from a network data analytics function (NWDAF), wherein the monitoring event indicates the network function to monitor data, corresponding to a type of data analytics, of a user equipment (UE) to be monitored, and the network function provides the data, corresponding to the type of data analytics, of the UE to be monitored; and
    monitoring, by the network function, the data, corresponding to the type of data analytics, of the UE to be monitored according to the monitoring event, wherein after monitoring, by the network function, the data, corresponding to the type of data analytics, of the UE to be monitored according to the monitoring event, the method further comprises:
    reporting, by the network function, the data, corresponding to the type of data analytics, of the UE to be monitored to the NWDAF.

13. The method according to claim 12, wherein while receiving, by the network function, the monitoring event from the NWDAF, the method further comprises:
    receiving, by the network function, a NWDAF address and/or an equipment identity of the NWDAF, and
    said reporting, by the network function, the data, corresponding to the type of data analytics, of the UE to be monitored to the NWDAF comprises:
    directly transmitting, by the network function, the data to the NWDAF according to the NWDAF address and/or the equipment identity.

14. The method according to claim 5, wherein said reporting, by the network function, the data, corresponding to the type of data analytics, of the UE to be monitored to the NWDAF comprises:
    reporting, by the network function, the data, corresponding to the type of data analytics, of the UE to be monitored to the NWDAF through an unified data management (UDM) or a policy control function (PCF); or
    reporting, by the network function, the data to a NEF through the UDM or the PCF, to transmit the data to the NWDAF by the NEF.

15. The method according to claim 12, wherein the network function comprises any one or more of an access and mobility management function (AMF), a session management function (SMF), a next generation-radio access network function (NG-RAN) and a user plane function (UPF).

16. The method according to claim 15, wherein the type of data analytics comprises moving trajectory analytics and/or service traffic analytics.

17. The method according to claim 16, wherein when the type of data analytics is the moving trajectory analytics, the monitoring event is to monitor location information of the UE to be monitored, and said monitoring, by the network function, the data, corresponding to the type of data analytics, of the UE to be monitored according to the monitoring event comprises:

monitoring, by the AMF, the location information of the UE to be monitored according to the monitoring event.

18. The method according to claim 16, wherein when the type of data analytics is the service traffic analytics, the monitoring event is to monitor traffic information of the UE to be monitored, and said monitoring, by the network function, the data, corresponding to the type of data analytics, of the UE to be monitored according to the monitoring event comprises:

monitoring, by the SMF or the UPF, the traffic information of the UE to be monitored according to the monitoring event.

\* \* \* \* \*